(12) United States Patent
Lu

(10) Patent No.: US 10,079,580 B2
(45) Date of Patent: Sep. 18, 2018

(54) PROXIMITY SENSOR

(71) Applicant: AUCMOS Technologies USA, Inc., Santa Clara, CA (US)

(72) Inventor: Teh-Shang Lu, Sunnyvale, CA (US)

(73) Assignee: CORE CHIP TECHNOLOGY (NANJING) CO., LTD., Nanjing, Jiangsu Province (CN)

( * ) Notice: Subject to any disclaimer, the term of this patent is extended or adjusted under 35 U.S.C. 154(b) by 5 days.

(21) Appl. No.: 15/391,974

(22) Filed: Dec. 28, 2016

(65) Prior Publication Data

US 2018/0183398 A1   Jun. 28, 2018

(51) Int. Cl.
| | | |
|---|---|---|
| *G01R 27/26* | (2006.01) | |
| *H03G 3/30* | (2006.01) | |
| *H03K 5/08* | (2006.01) | |
| *G01D 5/24* | (2006.01) | |
| *G01R 1/00* | (2006.01) | |
| *G08B 1/00* | (2006.01) | |

(52) U.S. Cl.
CPC ............. *H03G 3/30* (2013.01); *G01D 5/24* (2013.01); *H03K 5/082* (2013.01); *G01R 1/00* (2013.01); *G06Q 2220/00* (2013.01); *G08B 1/00* (2013.01)

(58) Field of Classification Search
CPC .... G08B 1/00; G01R 1/00; G06F 1/00; G06F 2101/00; G06Q 10/00; G06Q 2220/00
See application file for complete search history.

(56) References Cited

U.S. PATENT DOCUMENTS

| | | | | |
|---|---|---|---|---|
| 4,063,167 | A * | 12/1977 | Duly ................. | G01R 27/2605 324/611 |
| 4,658,213 | A * | 4/1987 | Finley .................... | G01R 31/34 322/99 |
| 9,811,220 | B2 * | 11/2017 | Povalac .................. | G06F 3/044 |
| 2006/0261818 | A1 * | 11/2006 | Zank ...................... | G01V 3/088 324/457 |
| 2016/0263769 | A1 * | 9/2016 | Laliberte ................ | B27G 19/02 |
| 2016/0370894 | A1 * | 12/2016 | Povalac ................ | G06F 3/0416 |

* cited by examiner

*Primary Examiner* — Jermele M Hollington
*Assistant Examiner* — Temilade Rhodes-Vivour
(74) *Attorney, Agent, or Firm* — Edward C. Kwok, Esq.; VLP Law Group, LLP

(57) ABSTRACT

A proximity detector circuit that receives a single-ended sensor signal includes (a) an adaptive level control circuit maintaining the single-ended sensor signal within a predetermined voltage range relative a common mode reference signal; and (b) a programmable gain amplifier receiving the single-ended sensor signal and the common mode reference signal as a differential input signal, and providing an output signal derived from amplifying the differential input signal.

6 Claims, 3 Drawing Sheets

PROXIMITY SENSOR

BACKGROUND OF THE INVENTION

1. Field of the Invention

The present invention relates to sensor circuits. Specifically, the present invention relates to sensor circuits for sensing an object in close proximity.

2. Discussion of the Related Art

A capacitive proximity sensor senses the presence of an object in its proximity by measuring a change in capacitance when the object comes into the proximity. FIG. 1 shows proximity sensing circuit 100, including the proximity sensor—which is represented by variable capacitor 101—together with conventional proximity detector circuit 150. The capacitance of variable capacitor 101 changes when an object comes into the vicinity of the proximity sensor. A typical capacitance value ($C_{IN}$) for variable capacitor 101 standing by may be, for example, between 100 and 200 pF, with a change in capacitance ($\Delta C_{IN}$) of 30 pF in the presence of a typical expected object Proximity detector circuit 150 includes amplifier 102, feedback capacitor 103, switches 104 and 105, offset voltage source 106 ($V_{OC}$), floating voltage source 108 ($V_F$) and modulation source 107. During capacitance measurement, switch 104 is closed and modulation source 107—which provides a modulation signal, such as a sequence of pulses—initiates capacitance measurement. After each measurement, switch 105 resets proximity detector circuit 150 for measurement at the beginning of each cycle. Output voltage $V_{OUT}$ at terminal 110 is given by:

$$V_{OUT} = \frac{\Delta C_{IN}}{C_{fb}} * \Delta V_{IN}$$

where $C_{fb}$ is the capacitance of feedback capacitor 103 and $\Delta V_{IN}$ is the "high" voltage of the pulse modulation signal. The gain at terminal 110 (voltage $V_{OUT}$) is given by:

$$\frac{\Delta C_{IN}}{C_{fb}} = \frac{V_X}{V_F} - 1$$

where $V_X$ is the voltage at the inverting terminal of operational amplifier 102. The change in input capacitance may be may be inferred from the measured ratio $$\frac{V_X}{V_F}.$$

Voltage $V_{OUT}$ is captured into analog-to-digital converter (ADC) circuit 111 to provide a digital value representing the measured capacitance value, which is then used for further signal processing.

Proximity sensing circuit 100 has a number of disadvantages. For example, proximity sensing circuit 100 may be susceptible to noise arising from the parasitic capacitance ($C_P$) in input terminal 112—which may include, for example, an input cable—is not taken into account. Floating voltage source 108 and modulation source 107 are other sources of noise. The required step of modulation using modulation circuit 107 of proximity sensing circuit 104 increases circuit cost and complexity.

SUMMARY

According to one embodiment of the present invention, a proximity detector circuit that receives a single-ended sensor signal includes (a) an adaptive level control circuit maintaining the single-ended sensor signal within a predetermined voltage range relative a common mode reference signal; and (b) a programmable gain amplifier receiving the single-ended sensor signal and the common mode reference signal as a differential input signal, and providing an output signal derived from amplifying the differential input signal. The single-ended sensor signal may be provided by a proximity sensor over a shielded lead.

In one embodiment of the present invention, the adaptive level control circuit may include a voltage clamp, which may be implemented, for example, by two or more back-to-back connected diodes. Furthermore, the adaptive level control circuit may be referenced to ground, a metal sheath of the shielded lead though a unit-gain amplifier, or a virtual ground provided by a center-tapped resistor.

The present invention is better understood upon consideration of the detailed description below in conjunction with accompanying drawings.

DETAILED DESCRIPTION OF THE PREFERRED EMBODIMENT

Figure 1:
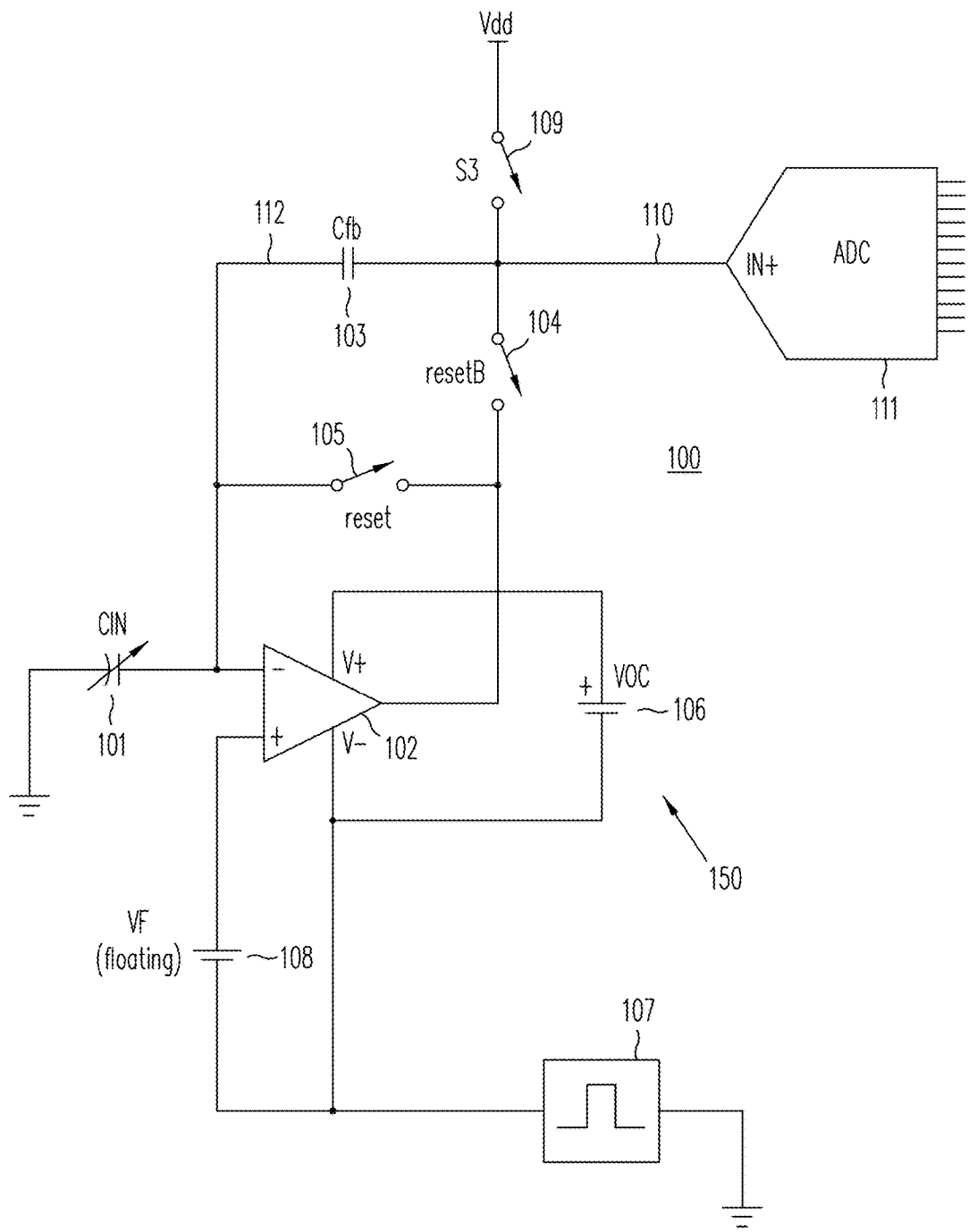
FIG. 1 shows proximity sensing circuit 100, including proximity sensor, represented by variable capacitor 101 and conventional proximity detector circuit 150.
Figure 2:
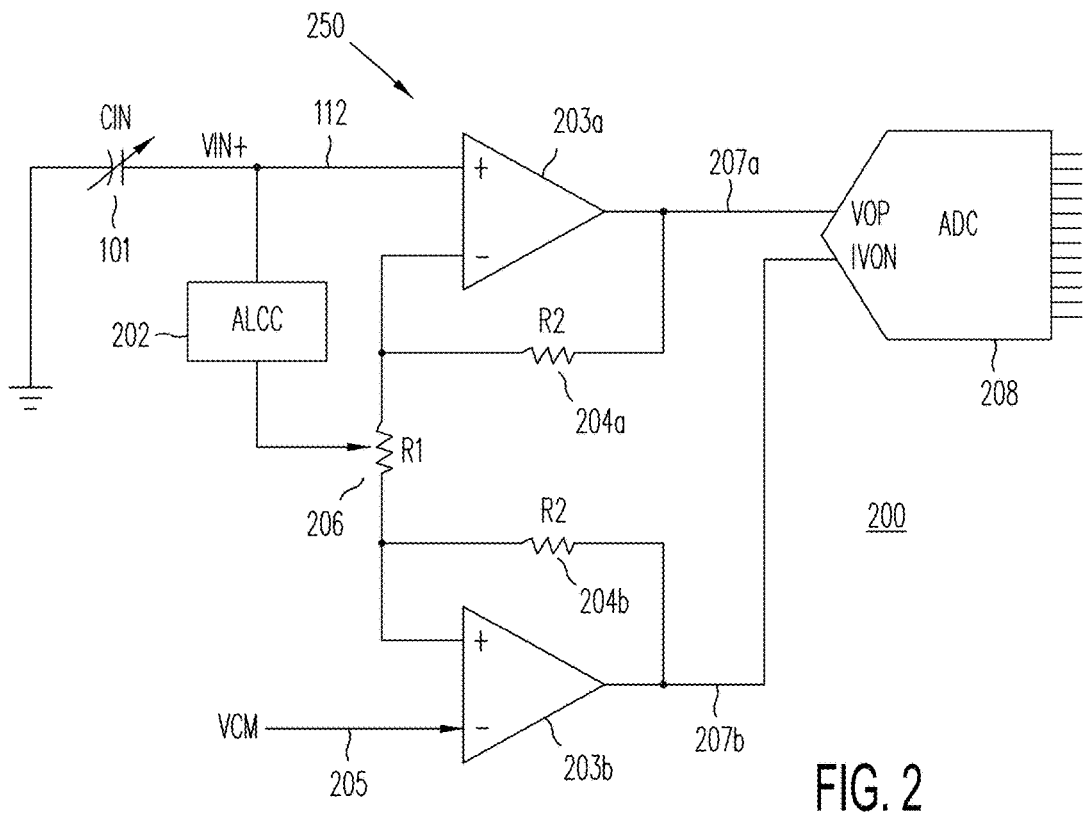
FIG. 2 shows proximity sensing circuit 200, in accordance with one embodiment of the present invention.

FIG. 2 shows proximity sensing circuit 200, in accordance with one embodiment of the present invention. As in FIG. 1, FIG. 2 shows variable capacitor 101 modeling a capacitive proximity sensor providing an input signal to proximity detector circuit 250, which includes adaptive level control circuit (ALCC) 202 and a programmable gain amplifier (PGA). In FIG. 2, single ended input signal from the proximity sensor represented by variable capacitor 102 is transformed into a differential signal using a common mode signal ($V_{CM}$). The differential signal—which is taken across input terminals 112 and 205—is the input signal to the PGA, which includes differential amplifiers 203a and 203b and resistors 204a, 204b and 206. As shown in FIG. 2, resistor 206 may be a center-tapped resistor. As indicated in FIG. 2, resistors 204a and 204b may have the same resistance value $R_2$, while resistor 206 may have a resistance value $R_1$. The output signal is the differential signal taken across terminals 203a and 203b and has the value ($V_{OP}-V_{ON}$). The gain of the differential PGA of FIG. 2 is given by:

$$\text{Gain} = \left(1 + \frac{2R_2}{R_1}\right)$$

The output differential signal of the differential PGA is provided to ADC circuit 208. A significant change in the digital output value of ADC circuit 208 indicates an object has come into the vicinity of the proximity sensor.

Figure 3:
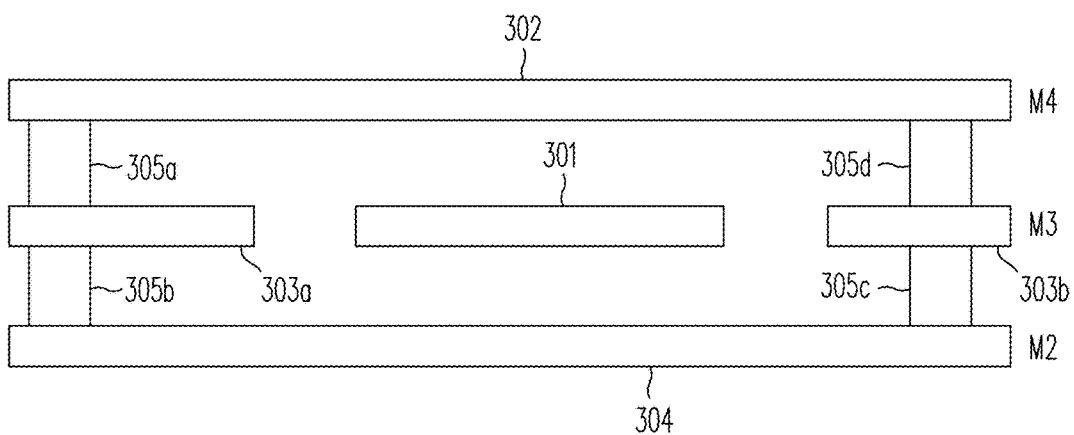
FIG. 3 shows a cross section of shielded signal line 301 using signal routing conductor layers M2, M3 and M4.

There are many ways to implement ALCC 202. Preferably, the lead between variable capacitor 101 and input terminal 112 of differential amplifier 203a of the PGA should be shielded. If provided on an integrated circuit, conductor layers for routing signals may be used to provide the shielding. For example, FIG. 3 shows a cross section of shielded signal line 301 using signal routing conductor layers M2, M3 and M4. As shown in FIG. 3, signal lead 301 on signal routing conductor layer M3 is surrounded metallic conductor traces 302, 303a, 304 and 303b on signal routing conductor layers M4, M3, M2 and M3, respectively. Conductor traces 302, 303a, 304 and 303b are preferably shorted to each other by vias 305a-305d and are preferably shorted to a common reference potential.

Figure 4A:
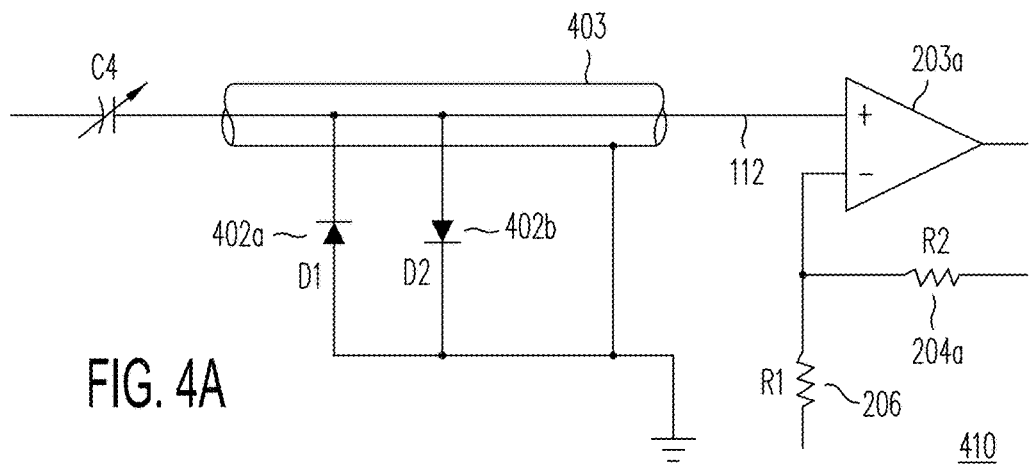
FIGS. 4a-4c shows implementations 410, 420 and 430 of ALCC 202, respectively, according to several embodiments of the present invention.
Figure 4B:
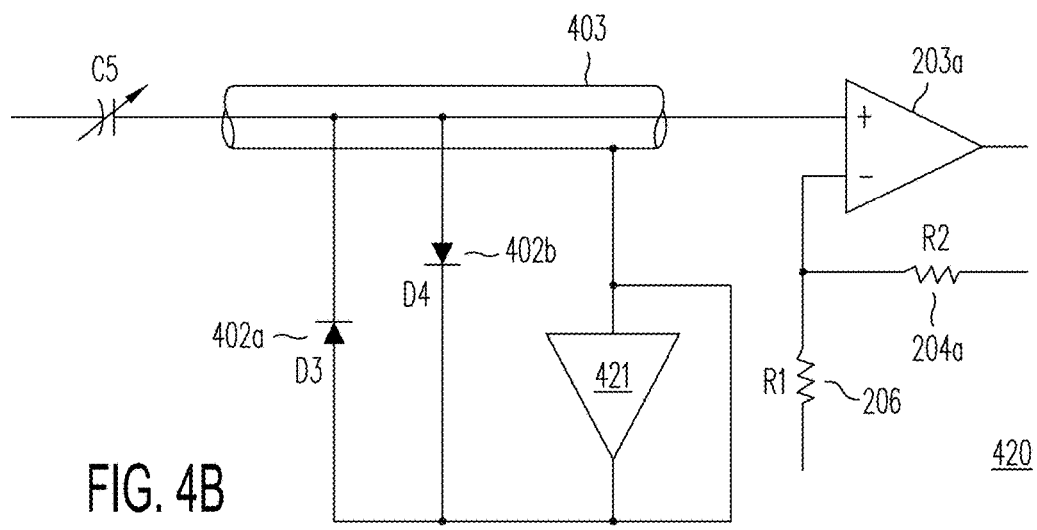
Figure 4C:
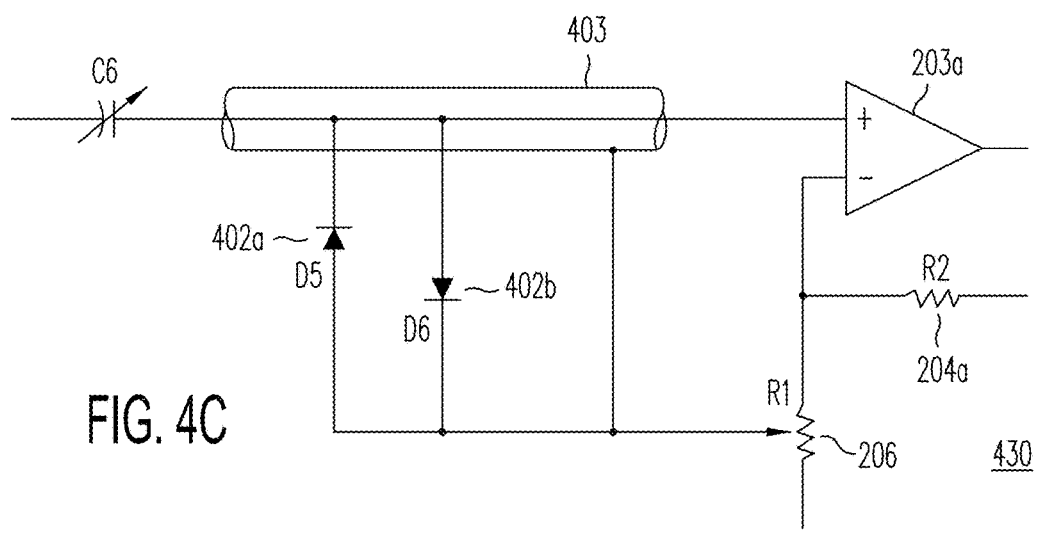

FIGS. 4a-4c shows implementations 410, 420 and 430 of ALCC 202, respectively, according to several embodiments of the present invention. As shown in each of FIGS. 4a-4c, input terminal 112 connecting variable capacitor 101 to differential amplifier 203a of the PGA is shown shielded by metal sheath 403, which may be implemented, for example, by conductor traces 302, 303a, 304 and 303b, as explained above with respect to FIG. 3. In each of FIGS. 4a-4c, to simplify this detailed description, proximity detector circuit 250 of FIG. 2 is shown only in part (including only differential amplifier 203a and resistors 204a and 206). In FIG. 4a, ALCC 202 is implemented by a voltage clamp (back-to-back diodes 402a and 402b) which, together with metal sheath 403, are referenced in ground. In FIG. 4b, ALCC 202 is implemented by the voltage clamp of back-to-back diodes 402a and 402b, which is referenced to metal sheath 403 by unit-gain amplifier 421. In FIG. 4c, ALCC 202 is implemented by the voltage clamp of back-to-back diodes 402a and 402b which, together with metal sheath 403, are referenced to the center tap of resistor 206. Center tap of resistor 206 provides a virtual ground.

The proximity sensing circuits of the present invention have numerous advantages over the proximity sensing circuits of the prior art. For example, unlike proximity sensing circuit 100 of FIG. 1, the proximity sensing circuits of the present invention are DC-balanced, have no need for signal modulation, does not require a floating bias voltage ($V_F$) and is insensitive to the parasitic capacitance in input terminal 112. Furthermore, as the input signal is differential, proximity sensing circuits of the present invention inherently rejects common mode noise, such as those arising from 50/60 Hz AC power supply noise.

The above detailed description is provided to illustrate specific embodiments of the present invention and is not intended to be limiting. Numerous variations and modifications within the scope of the present invention are possible. The present invention is set forth in the following claims.

I claim:

1. A proximity detector circuit receiving a single-ended sensor signal from a proximity sensor over a shielded lead and a common mode reference signal, comprising:
    an adaptive level control circuit maintaining the single-ended sensor signal within a predetermined voltage range relative to the common mode reference signal; and
    a programmable gain amplifier receiving the single-ended sensor signal and the common mode reference signal as a differential input signal, and providing an output signal derived from amplifying the differential input signal.

2. The proximity detector circuit of claim 1, wherein the adaptive level control circuit comprises a voltage clamp.

3. The proximity detector circuit of claim 2, wherein the voltage clamp comprises two or more back-to-back connected diodes.

4. The proximity detector circuit of claim 1, wherein the adaptive level control circuit is referenced to ground.

5. The proximity detector circuit of claim 1, wherein the shielded lead includes a metal sheath and wherein the adaptive level control circuit is referenced to the metal sheath though a unit-gain amplifier.

6. The proximity detector circuit of claim 1, wherein the programmable gain amplifier comprises a center-tapped resistor providing a virtual ground, and wherein the adaptive level control circuit is referenced to the virtual ground.

* * * * *